(12) United States Patent
Boo

(10) Patent No.: US 11,580,988 B2
(45) Date of Patent: Feb. 14, 2023

(54) ELECTRONIC APPARATUS AND CONTROL METHOD THEREOF

(71) Applicant: Samsung Electronics Co., Ltd., Suwon-si (KR)

(72) Inventor: Youngjong Boo, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 315 days.

(21) Appl. No.: 16/733,792

(22) Filed: Jan. 3, 2020

(65) Prior Publication Data

US 2020/0219514 A1 Jul. 9, 2020

(30) Foreign Application Priority Data

Jan. 7, 2019 (KR) .................. 10-2019-0001919

(51) Int. Cl.
| | | |
|---|---|---|
| *G10L 15/30* | (2013.01) | |
| *G06F 3/04817* | (2022.01) | |
| *H04N 21/40* | (2011.01) | |
| *G10L 15/22* | (2006.01) | |
| *H04M 1/72415* | (2021.01) | |
| *H04L 67/12* | (2022.01) | |
| *H04M 1/72412* | (2021.01) | |
| *G10L 15/26* | (2006.01) | |

(52) U.S. Cl.
CPC .......... *G10L 15/30* (2013.01); *G06F 3/04817* (2013.01); *G10L 15/22* (2013.01); *H04L 67/12* (2013.01); *H04M 1/72415* (2021.01); *H04N 21/40* (2013.01); *G10L 15/26* (2013.01); *H04M 1/72412* (2021.01)

(58) Field of Classification Search
CPC ... G10L 15/22; G10L 2015/223; G10L 15/26; G10L 15/30; G06F 3/167
See application file for complete search history.

(56) References Cited

U.S. PATENT DOCUMENTS

| 6,492,999 | B1 | 12/2002 | Fado et al. | |
| 8,340,975 | B1* | 12/2012 | Rosenberger | G10L 15/22 |
| | | | | 704/275 |
| 9,852,733 | B2 | 12/2017 | Yamada | |
| 9,930,519 | B2 | 3/2018 | Kim et al. | |
| 10,075,539 | B1* | 9/2018 | Sabur | G06F 3/167 |
| 2005/0044225 | A1 | 2/2005 | Ota et al. | |

(Continued)

FOREIGN PATENT DOCUMENTS

| EP | 3 425 889 A1 | 12/2016 |
| JP | 2018-10110 | 1/2018 |

(Continued)

*Primary Examiner* — Mark Villena
(74) *Attorney, Agent, or Firm* — Staas & Halsey LLP

(57) ABSTRACT

Disclosed is an electronic apparatus. The electronic apparatus includes a first communicator, a second communicator; and a processor configured to determine whether or not an external electronic apparatus outputting input speech is connectable to a network connectable through the first communicator, based on the input speech, and to transmit a signal for controlling the external electronic apparatus to the external electronic apparatus through the first communicator or the second communicator depending on whether or not the external electronic apparatus is connectable to the network.

14 Claims, 18 Drawing Sheets

(56) References Cited

U.S. PATENT DOCUMENTS

| | | | |
|---|---|---|---|
| 2013/0325450 A1* | 12/2013 | Levien | G10L 15/065 704/201 |
| 2015/0348554 A1* | 12/2015 | Orr | G06F 3/167 704/275 |
| 2016/0191380 A1* | 6/2016 | De | H04W 40/02 370/338 |
| 2016/0197987 A1 | 7/2016 | Lee et al. | |
| 2016/0282406 A1 | 9/2016 | Park | |
| 2017/0236510 A1* | 8/2017 | Fuchiwaki | G10L 15/30 704/251 |
| 2018/0165061 A1* | 6/2018 | Nicolich-Henkin | H04L 12/282 |
| 2018/0174584 A1* | 6/2018 | Chih | G10L 15/22 |
| 2018/0329836 A1* | 11/2018 | Maegawa | H04B 1/06 |
| 2019/0124049 A1* | 4/2019 | Bradley | G06F 21/6245 |
| 2019/0156824 A1* | 5/2019 | Maeda | G06F 3/1288 |
| 2019/0180770 A1* | 6/2019 | Kothari | G10L 25/03 |
| 2020/0312317 A1* | 10/2020 | Kothari | G06F 9/5027 |

FOREIGN PATENT DOCUMENTS

| | | |
|---|---|---|
| JP | 6355939 | 7/2018 |
| KR | 10-2005-0016125 | 2/2005 |
| KR | 10-2015-0054123 | 5/2015 |
| KR | 10-1520870 | 5/2015 |
| KR | 10-2016-0039830 | 4/2016 |
| WO | WO2015/029379 | 3/2015 |
| WO | WO 2017/171204 A1 | 10/2017 |

* cited by examiner

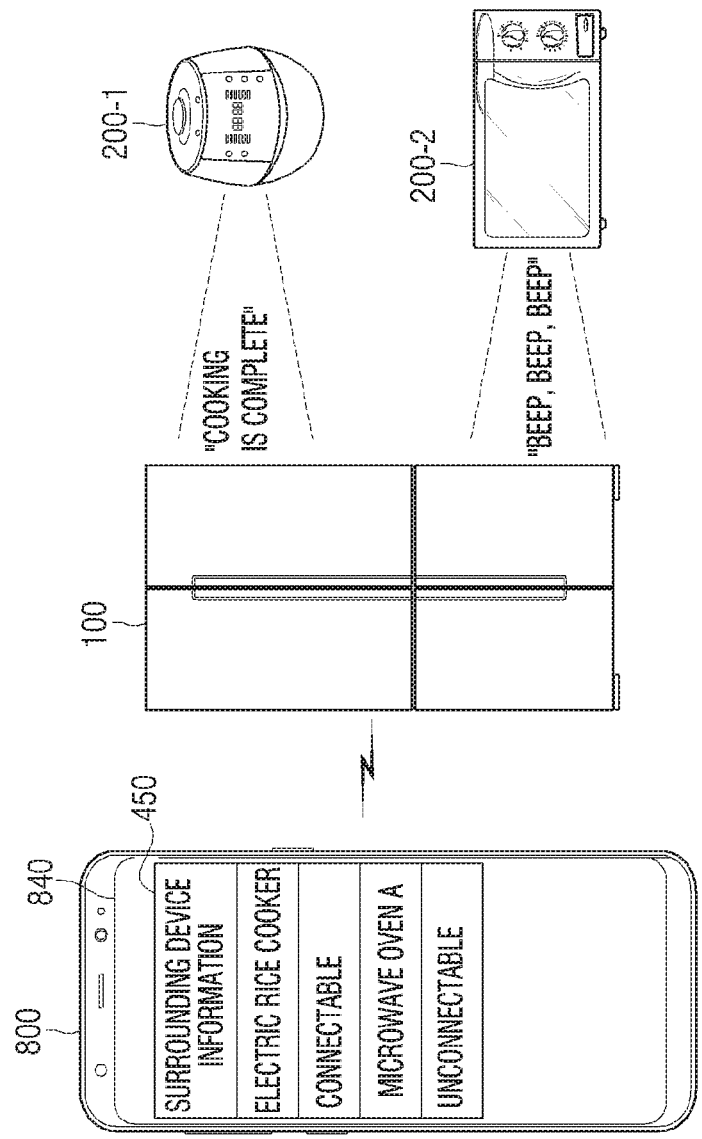

ELECTRONIC APPARATUS AND CONTROL METHOD THEREOF

CROSS-REFERENCE TO RELATED APPLICATION(S)

This application is based on and claims priority under 35 U.S.C. § 119 to Korean Patent Application No. 10-2019-0001919, filed on Jan. 7, 2019, in the Korean Intellectual Property Office, the disclosure of which is incorporated by reference herein in its entirety.

BACKGROUND OF THE INVENTION

Field of the Invention

Apparatuses consistent with the disclosure relate to an electronic apparatus, and more particularly, to an electronic apparatus enabling a speech recognition-based control with respect to an external electronic apparatus which has no speech recognition function of its own.

Description of the Related Art

For Internet of Things (IoT), a network technology, in which a plurality of electronic apparatuses establish a communication network and a user may use any one electronic apparatus among them to control all the remaining electronic apparatuses, has been developed.

Particularly, a technology, in which in a case where there is at least one electronic apparatus capable of recognizing speech of a user, a recognition result is shared through a network, such that a plurality of electronic apparatuses are controlled based on the speech of the user, has been devised.

In general, however, a plurality of electronic apparatuses in a house are not necessarily products of the same manufacturer, and network connection between electronic apparatuses corresponding to products of different manufacturers is usually not easy.

FIG. 1 is a diagram for describing such a problem of the related art in detail (it is to be noted that the following description of the problem of the related art is provided independently in the disclosure without referring to a separate disclosure or study).

In FIG. 1, a situation, in which a refrigerator 10, a microwave oven 20, and a gas stove 30 are products of the same manufacturer A, and thus a communication network is established among them, but an electric rice cooker 40 may not establish a communication network with the products of the manufacturer A because the electric rice cooker 40 is a product of a manufacturer B, is assumed.

In this case, the refrigerator 10 capable of performing speech recognition may recognize not only user speech to activate a function of the refrigerator 10, but also user speech to activate a function of the microwave oven 20 or the gas stove 30. For example, in a case where the refrigerator 10 recognizes user speech "turn off the microwave oven", the refrigerator 10 may transmit, to the microwave oven 20 through the network, a signal to make the microwave oven 20, that is currently turned on, be turned off by itself, and as a result, the microwave oven 20 may be turned off.

In contrast, the communication network may not be established between the refrigerator 10 and the electric rice cooker 40, and thus the user may not control the electric rice cooker 40 through the refrigerator 10. In this case, unless the electric rice cooker 40 has a speech recognition function of its own, the user may not use the speech recognition to control the electric rice cooker 40.

SUMMARY OF THE INVENTION

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides an electronic apparatus which may recognize an external electronic apparatus and provide a function of controlling the external electronic apparatus, regardless of whether or not a communication network may be established between the electronic apparatus and the external electronic apparatus.

Further, the disclosure provides an electronic apparatus having a speech recognition function and outputting a signal capable of controlling an external electronic apparatus according to a speech recognition result, to control the external electronic apparatus, which has no speech recognition function of its own, based on speech recognition.

According to an embodiment of the disclosure, an electronic apparatus includes: a first communicator; a second communicator; and a processor configured to determine whether or not an external electronic apparatus outputting input speech is connectable to a network connectable through the first communicator, based on the input speech, and to transmit a signal for controlling the external electronic apparatus to the external electronic apparatus through the first communicator or the second communicator depending on whether or not the external electronic apparatus is connectable to the network, wherein the processor controls the first communicator to transmit the signal for controlling the external electronic apparatus to the external electronic apparatus through the network in a case where the external electronic apparatus is connectable to the network, and the processor controls the second communicator to transmit the signal for controlling the external electronic apparatus to the external electronic apparatus in a case where the external electronic apparatus is unconnectable to the network.

The processor may acquire identification information of the external electronic apparatus based on text obtained by converting the input speech, and determine whether or not the external electronic apparatus corresponds to an electronic apparatus connectable to the network based on the acquired identification information of the external electronic apparatus.

The processor may acquire information regarding at least one of a product name or a manufacturer of the external electronic apparatus by searching a server, in which information regarding speech output from each of a plurality of external electronic apparatuses is stored, for the external electronic apparatus outputting the speech corresponding to the text.

The processor may connect the electronic apparatus to the network through the first communicator, and transmit, to the external electronic apparatus through the network, the signal for controlling the external electronic apparatus according to the input speech of a user, in a case where the external electronic apparatus is connectable to the network.

The processor may output a guide for connecting the external electronic apparatus to the network in a case where the external electronic apparatus is connectable to the network, and the processor may output a guide for notifying that the external electronic apparatus is unconnectable to the network in a case where the external electronic apparatus is unconnectable to the network.

The processor may acquire state information of the external electronic apparatus based on text obtained by converting the input speech, and output a guide to utterance contents for controlling the external electronic apparatus based on the acquired state information of the external electronic apparatus.

The processor may determine whether or not information for generating a signal for controlling the external electronic apparatus according to a communication method used by the second communicator is acquirable in a case where the external electronic apparatus is unconnectable to the network.

The processor may generate the signal for controlling the external electronic apparatus according to the acquired information and the input speech of a user, and control the second communicator to transmit the generated signal to the external electronic apparatus, in a case where the information is acquirable.

The processor may output a guide for notifying that the external electronic apparatus is uncontrollable through the electronic apparatus, in a case where the external electronic apparatus is unconnectable to the network and the information is unacquirable.

The processor may control the first communicator to enable connection to the network through at least one communication method of wireless fidelity (WiFi) or Bluetooth in a case where the external electronic apparatus is connectable to the network, and the processor may control the second communicator to transmit an infrared signal for controlling the external electronic apparatus to the external electronic apparatus in a case where the external electronic apparatus is unconnectable to the network.

According to another embodiment of the disclosure, a control method for an electronic apparatus including a first communicator and a second communicator includes: determining whether or not an external electronic apparatus outputting input speech is connectable to a network connectable through the first communicator, based on the input speech; and transmitting a signal for controlling the external electronic apparatus to the external electronic apparatus through the first communicator or the second communicator depending on whether or not the external electronic apparatus is connectable to the network, wherein in the transmitting, the signal for controlling the external electronic apparatus is transmitted to the external electronic apparatus through the network and the first communicator in a case where the external electronic apparatus is connectable to the network, and the signal for controlling the external electronic apparatus is transmitted to the external electronic apparatus through the second communicator in a case where the external electronic apparatus is unconnectable to the network.

In the determining, identification information of the external electronic apparatus may be acquired based on text obtained by converting the input speech, and whether or not the external electronic apparatus corresponds to an electronic apparatus connectable to the network may be determined based on the acquired identification information of the external electronic apparatus.

In the determining, information regarding at least one of a product name or a manufacturer of the external electronic apparatus may be acquired by searching a server, in which information regarding speech output from each of a plurality of external electronic apparatuses is stored, for the external electronic apparatus outputting the speech corresponding to the text.

In the transmitting, in a case where the external electronic apparatus is connectable to the network, the electronic apparatus may be connected to the network through the first communicator, and the signal for controlling the external electronic apparatus according to the input speech of a user may be transmitted to the external electronic apparatus through the network and the first communicator.

The control method may further include: outputting a guide for connecting the external electronic apparatus to the network in a case where the external electronic apparatus is connectable to the network; and outputting a guide for notifying that the external electronic apparatus is unconnectable to the network in a case where the external electronic apparatus is unconnectable to the network.

The control method may further include: acquiring state information of the external electronic apparatus based on text obtained by converting the input speech; and outputting a guide to utterance contents for controlling the external electronic apparatus based on the acquired state information of the external electronic apparatus.

The control method may further include: determining whether or not information for generating a signal for controlling the external electronic apparatus according to a communication method used by the second communicator is acquirable, in a case where the external electronic apparatus is unconnectable to the network.

In the transmitting, the signal for controlling the external electronic apparatus according to the acquired information and the input speech of a user may be generated, and the generated signal may be transmitted to the external electronic apparatus through the second communicator, in a case where the information is acquirable.

The control method may further include: outputting a guide for notifying that the external electronic apparatus is uncontrollable through the electronic apparatus, in a case where the external electronic apparatus is unconnectable to the network and the information is unacquirable.

In the transmitting, the first communicator may be controlled to enable connection to the network through at least one communication method of wireless fidelity (WiFi) or Bluetooth in a case where the external electronic apparatus is connectable to the network, and an infrared signal for controlling the external electronic apparatus may be transmitted to the external electronic apparatus through the second communicator in a case where the external electronic apparatus is unconnectable to the network.

The electronic apparatus according to the disclosure may identify an external electronic apparatus only using speech output from the external electronic apparatus regardless of whether or not the external electronic apparatus and the electronic apparatus may be connected to each other through the same communication network. Further, the electronic apparatus may remotely control the external electronic apparatus without communication network connection.

Further, the electronic apparatus may control the external electronic apparatus according to a result of recognizing speech of a user, and thus it is possible to provide a speech recognition-based control with respect to the external electronic apparatus even in a case where the external electronic apparatus has no speech recognition function of its own.

Additional and/or other aspects and advantages of the disclosure will be set forth in part in the description which follows and, in part, will be obvious from the description, or may be learned by practice of the disclosure.

BRIEF DESCRIPTION OF THE DRAWING FIGURES

The above and/or other embodiments of the disclosure will be more apparent by describing certain embodiments of the disclosure with reference to the accompanying drawings, in which:

FIG. 8A is a diagram for describing an example in which an external apparatus provides information regarding an external electronic apparatus identified by the electronic apparatus;

DETAILED DESCRIPTION OF THE EXEMPLARY EMBODIMENTS

Figure 1:
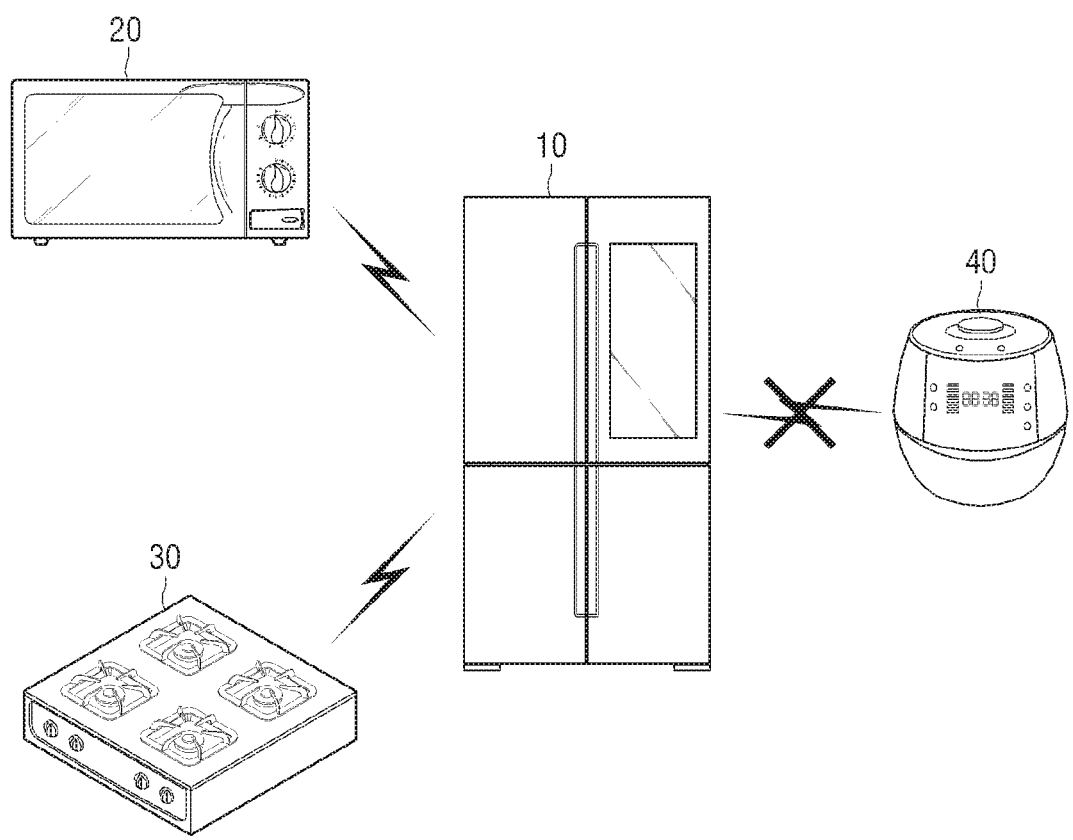
FIG. 1 is a diagram for describing a problem of the related art.

Before describing the disclosure in detail, a description method of the specification and the drawings is described below.

First, as terms used in the specification and claims, general terms have been selected in consideration of functions in various embodiments of the disclosure. However, these terms may be changed with an intention of an engineer who works in a corresponding field, legal or technical interpretation, the emergence of new technology, and the like. In addition, some terms may be terms arbitrarily selected by an applicant. These terms may be interpreted as having a meaning defined in the specification, and in case that the terms are not specifically defined, the terms may be interpreted based on general contents of the specification and a common technical knowledge in a corresponding technical field.

In addition, throughout the accompanying drawings in the specification, like reference numerals denote parts or components performing substantially the same functions. For convenience of explanation and understanding, the same reference numerals will be used in embodiments different from each other. That is, even when components having the same reference numeral are illustrated in all of a plurality of drawings, it does not mean that the plurality of drawings illustrate the same embodiment.

Further, in the specification and claims, terms including an ordinal number such as "first", "second", or the like may be used in order to distinguish components from each other. The ordinal number is used to distinguish the same or similar components from each other, and a meaning of a term is not limited by the use of the ordinal number. For example, in case of a component represented by a term combined with the ordinal number, the order of use or disposition of the component should not be limited by the ordinal number. If necessary, ordinal numbers may be replaced with each other.

In the specification, singular forms are intended to include plural forms unless the context clearly indicates otherwise. It will be further understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

In embodiments of the disclosure, a "module", a "unit", or a "-er/-or" refers to a component performing at least one function or operation, and may be implemented by hardware or software or be implemented by a combination of hardware and software. In addition, a plurality of "modules", a plurality of "units", or a plurality of "-ers/-ors" may be integrated in at least one module and be implemented by at least one processor except for a "module", a "unit", or a "-er/-or" that needs to be implemented by specific hardware.

In embodiments of the disclosure, connection between one portion and another portion includes not only direct connection but also indirect connection via a medium. In addition, unless explicitly described otherwise, "comprising" any components will be understood to imply the inclusion of other components but not the exclusion of any other components.

Figure 2:
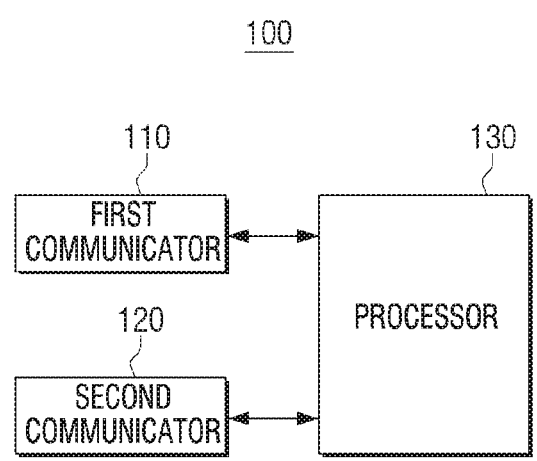
FIG. 2 is a block diagram for describing components of an electronic apparatus according to an embodiment of the disclosure.

FIG. 2 is a block diagram for describing components of an electronic apparatus 100 according to an embodiment of the disclosure.

The electronic apparatus 100 may be any one of various household appliances such as a refrigerator, a television (TV), a remote controller, a set-top box, a smart TV, a washing machine, a gas stove, a microwave oven, a radio, a wire telephone, an air conditioner, an electric rice cooker, an oven, an interphone, and an air cleaner. Further, the electronic apparatus 100 may also be implemented by a desktop personal computer (PC), a tablet PC, a laptop computer, a smartphone, or the like.

Referring to FIG. 2, the electronic apparatus 100 may include a first communicator 110, a second communicator 120, and a processor 130.

The first communicator 110 is a component for performing communication with at least one external apparatus (not illustrated) in a wired or wireless manner.

In a case of performing data communication with the external apparatus in a wireless manner, the first communicator 110 may include at least one of a wireless fidelity (WiFi) direct communication module, a Bluetooth module, an infrared data association (IrDA) module, a near field communication (NFC) module, a Zigbee module, a cellular communication module, a 3rd generation (3G) mobile communication module, a 4th generation (4G) mobile communication module, or a 4G long term evolution (LTE) communication module.

In a case of performing data communication with the external apparatus in a wired manner, the first communicator 110 may be connected to a coaxial cable, an optical fiber cable, or the like to perform local area network communication, thereby transmitting or receiving various pieces of data.

The second communicator 120 is also a component for performing communication with at least one external apparatus (not illustrated).

However, the second communicator 120 may only perform one-way communication, unlike the first communicator 110. Specifically, the processor 130 may control the second communicator 120 to output a signal for controlling an external electronic apparatus (not illustrated).

The second communicator 120 may include a module for outputting an infrared (IR) signal, a radio frequency (RF) signal, or the like for a remote control. The processor 130 may also control a direction in which the second communicator output the IR signal or the RF signal.

Meanwhile, although a case where the first communicator 110 and the second communicator 120 are separate components is illustrated in FIG. 2, the first communicator 110 and the second communicator 120 may also be integrated into one communicator to perform all of operations of the first communicator 110 and the second communicator 120 according to the disclosure.

The processor 130 may control overall operation of the electronic apparatus 100.

In this regard, the processor 130 may include a random access memory (RAM)(not illustrated), a read only memory (ROM)(not illustrated), a central processing unit (CPU)(not illustrated), a graphic processing unit (GPU)(not illustrated), a system bus (not illustrated), and the like, and may perform an operation or data processing for a control of other components included in the electronic apparatus 100.

According to an embodiment, the processor 130 may determine whether or not an external electronic apparatus (not illustrated) outputting input speech may be connected to a network connectable through the first communicator 110, based on the input speech.

Specifically, the processor 130 may use the input speech to identify the external electronic apparatus outputting the input speech and determine whether or not the identified external electronic apparatus may be connected to the same network as that of the first communicator 110.

The input speech may be directly input through a microphone (not illustrated) included in a user inputter (not illustrated) provided in the electronic apparatus 100, or may be input through a microphone of at least one external apparatus (not illustrated) and received through an input and output port (not illustrated), a broadcast receiver (not illustrated), or the first communicator 110 of the electronic apparatus 100 in a form of data/signal.

The processor 130 may acquire (obtain) identification information of the external electronic apparatus based on information regarding the input speech. Here, the information regarding the input speech may be feature information of the input speech, and/or information regarding text obtained by recognizing and converting the input speech.

The feature information of the input speech may correspond to various parameters obtained by performing digitization, frequency conversion, and the like with respect to the corresponding speech, such as pitch, formant, a linear predictive cepstral coefficient (LPCC), a mel-frequency cepstral coefficient (MFCC), a perceptual linear predictive (PLP) coefficient, and the like. Further, the text obtained by converting the input speech is text according to a speech recognition result.

The processor 130 may acquire identification information of the external electronic apparatus outputting the input speech by using information regarding speech of a plurality of external electronic apparatuses. The information regarding the speech of the plurality of external electronic apparatuses may include feature information of the speech output from each of the plurality of external electronic apparatuses, and/or information regarding text obtained by converting the speech output from each of the plurality of external electronic apparatuses. In a case where the external electronic apparatus outputting the input speech is one of the plurality of external electronic apparatuses, the processor 130 may identify the external electronic apparatus.

The information regarding the speech of the plurality of external electronic apparatuses may be pre-stored in the electronic apparatus 100, or the processor 130 may receive the information regarding the speech of the plurality of external electronic apparatuses, which is stored in a server (not illustrated) or the like, through the first communicator 110, the input and output port (not illustrated), or the like to use the same.

In a case where the information regarding the speech of the plurality of external electronic apparatuses is stored in the server (not illustrated), the processor 130 may acquire information regarding at least one of a product name or a manufacturer of the external electronic apparatus by searching the server for the external electronic apparatus outputting the speech, which corresponds to the text obtained by converting the input speech.

As an example, it may be assumed that a TV "1000 (product number)" of a company A outputs speech "the power is off" at the time of shutting down the power, and a TV "0001" of a company B outputs speech "power off" according to the information regarding the speech, which is stored in the server. At this time, in a case where a result of recognizing the input speech by the processor 130 corresponds to text "power off", the processor 130 may identify that the external electronic apparatus outputting the input speech is the TV "0001" of the company B.

Meanwhile, although only the text obtained by converting the input speech is considered in the above-described example, it goes without saying that the processor 130 may consider the feature information of the input speech as well.

Figure 3:
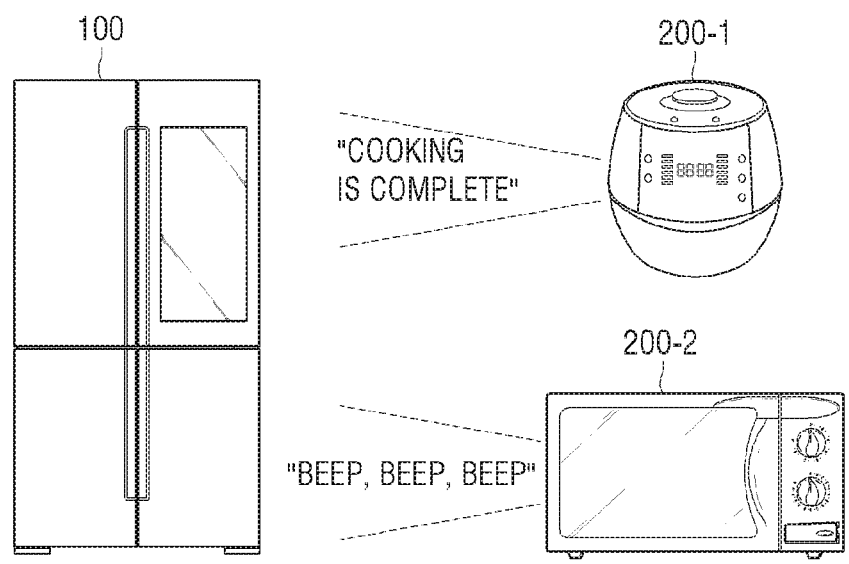
FIG. 3 is a diagram for describing an example in which the electronic apparatus identifies an external electronic apparatus.

FIG. 3 is a diagram for describing an example in which the electronic apparatus identifies an external electronic apparatus. It is assumed that the electronic apparatus 100 is a refrigerator in FIG. 3, and the refrigerator illustrated in FIG. 3 includes a display. However, the electronic apparatus 100 may also be a refrigerator which does not include a display and/or includes an additional component such as a water purifier.

Referring to FIG. 3, the electronic apparatus 100 implemented by a refrigerator may receive speech "cooking is complete" output from an electric rice cooker 200-1 and speech "beep, beep, beep" output from a microwave oven 200-2, and compare information regarding the input speech with the pre-stored information regarding the speech of the plurality of external electronic apparatuses to identify the identification information, that is, product names and manufacturers of the electric rice cooker 200-1 and the microwave oven 200-2.

The processor 130 may determine, based on the identification information of the external electronic apparatus, whether or not the external electronic apparatus corresponds to an electronic apparatus that may be connected to the same network as that of the first communicator 110.

At this time, the processor 130 may identify whether or not the external electronic apparatus is included in list information regarding external electronic apparatuses that may be connected through the same network as that of the first communicator 110. In a case where it is identified that the external electronic apparatus is included in the list information, the processor 130 may determine that the external electronic apparatus may be connected to the same network as that of the first communicator 110. In contrast, in a case where it is identified that the external electronic apparatus is not included in the list information, the processor 130 may determine that the external electronic apparatus may not be connected to the same network as that of the first communicator 110. In this case, the list information may be stored in the electronic apparatus 100 or may be stored in the server (not illustrated).

Alternatively, the processor 130 may acquire communication information corresponding to the identification information of the external electronic apparatus from the server (not illustrated) or the like, transmit a signal to the external electronic apparatus through the first communicator 110 according to the acquired communication information, and then identify whether or not a response signal is received from the external electronic apparatus. In a case where it is not possible to acquire the communication information or the response signal is not received even though the signal is transmitted, the processor 130 may determine that the external electronic apparatus may not be connected to the same network as that of the first communicator 110. In contrast, in a case where the response signal is received, the processor 130 may determine that the external electronic apparatus may be connected to the same network as that of the first communicator 110.

Figure 4A:
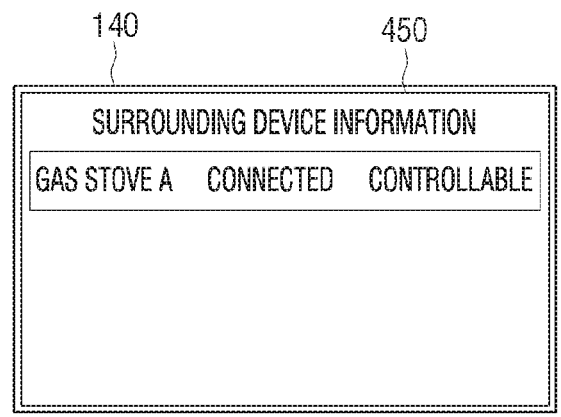
FIG. 4A is a diagram for describing an example in which the electronic apparatus provides information regarding an identified external electronic apparatus.
Figure 4B:
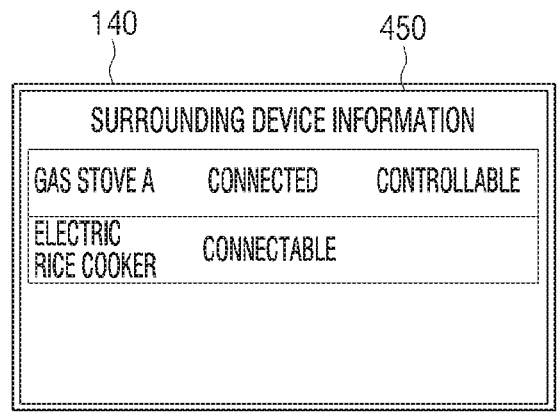
FIG. 4B is a diagram for describing an example in which the electronic apparatus provides information regarding an identified external electronic apparatus.
Figure 4C:
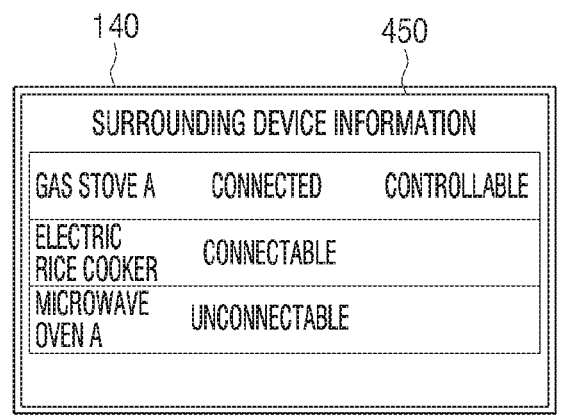
FIG. 4C is a diagram for describing an example in which the electronic apparatus provides information regarding an identified external electronic apparatus.

FIGS. 4A to 4C each are a diagram for describing an example in which the electronic apparatus 100 provides information regarding an identified external electronic apparatus.

Referring to FIG. 4A, a display 140 of the electronic apparatus 100 may display a user interface (UI) 450 providing information regarding a surrounding device. The UI 450 displays that a "gas stove A" is present around the electronic apparatus 100, is connected to the same network as that of the electronic apparatus 100, and may be controlled through the electronic apparatus 100.

In FIG. 4B, a situation, in which the electric rice cooker 200-1 present around the electronic apparatus 100 as in FIG. 3 outputs speech "cooking is complete" and as a result, the electronic apparatus 100 identifies the presence of the electric rice cooker 200-1, is assumed. Further, it is assumed that the electronic apparatus 100 and the electric rice cooker 200-1 may be connected to the same network, in FIG. 4B.

Referring to FIG. 4B, the UI 450 may display that an "electric rice cooker B" (a product name of the electric rice cooker 200-1) is present around the electronic apparatus 100 and the "electric rice cooker B" may be connected to the same network as that of the electronic apparatus 100.

In FIG. 4C, a situation, in which the microwave oven 200-2 present around the electronic apparatus 100 as in FIG. 3 outputs speech "beep, beep, beep" and as a result, the electronic apparatus 100 identifies the presence of the microwave oven 200-2, is assumed. Further, it is assumed that the electronic apparatus 100 and the microwave oven 200-2 may not be connected to the same network, in FIG. 4C.

Referring to FIG. 4C, the UI 450 may display that a "microwave oven A" (a product name of the microwave oven 200-2) is present around the electronic apparatus 100 and the "microwave oven A" may not be connected to the same network as that of the electronic apparatus 100.

Meanwhile, although only a case where the respective UIs are visually displayed is illustrated in FIGS. 4A to 4C described above, a case where the UI is output in a form of speech or in other forms is also possible.

The processor 130 may transmit a signal for controlling an external electronic apparatus through the first communicator or the second communicator depending on whether or not the external electronic apparatus may be connected to the same network as that of the first communicator 110.

Specifically, in a case where the external electronic apparatus may be connected to the same network as that of the first communicator 110, the processor 130 may control the first communicator 110 to transmit a signal for controlling the external electronic apparatus to the external electronic apparatus through the corresponding network (hereinafter, an example in which two or more communication networks are connectable will be described). In this case, the first communicator 110 may not only be connected to one network according to one specific communication method among various communication methods such as WiFi and Bluetooth, but also be connected to two or more networks corresponding to the two or more communication methods, respectively. Alternatively, the first communicator 110 may be connected to a plurality of different networks according to the same communication method.

Meanwhile, in a case where the external electronic apparatus may not be connected to the same network as that of the first communicator 110, the processor 130 may control the second communicator to transmit (output), outside of the network, a signal for controlling the external electronic apparatus to the external electronic apparatus.

There may be a difference in a communication method, in which the signal for controlling an external electronic apparatus is generated and transmitted, between a case of using the first communicator and a case of using the second communicator. This is because network communication is used in the case of using the first communicator and network communication may not be used in the case of using the second communicator.

For example, the first communicator may be connected to the same network as that of the external electronic apparatus according to the communication method such as WiFi or Bluetooth to transmit a signal for controlling the external electronic apparatus, whereas, the second communicator may output an infrared signal for remotely controlling the external electronic apparatus.

In a case where the external electronic apparatus may be connected to the same network as that of the first communicator 110, the processor 130 may output a guide for connecting the external electronic apparatus to the corresponding network. At this time, the guide may notify that the external electronic apparatus and the electronic apparatus 100 may be connected to the same network. Further, the guide may be provided as a UI which is visually displayed or output as speech, and a user command to select whether or not to enable connection to the same network as that of the external electronic apparatus through the first communicator 110 may be received through the UI.

In contrast, in a case where the external electronic apparatus may not be connected to the same network as that of the first communicator 110, the processor 130 may output a guide for notifying that the external electronic apparatus and the electronic apparatus 100 may not be connected to the same network.

In a case where the external electronic apparatus may not be connected to the same network as that of the first communicator 110, the processor 130 may determine whether or not information for generating a signal for controlling the external electronic apparatus according to the communication method used by the second communicator 120 may be acquired.

For example, in a case where the second communicator 120 may generate and output an infrared signal, the processor 130 may determine whether or not code or command information of an infrared signal for remotely controlling the external electronic apparatus may be acquired. In this case, the processor 130 may search the electronic apparatus 100 or an external server (not illustrated) for the code or command information of the infrared signal for remotely controlling the external electronic apparatus by using identification information of the external electronic apparatus.

In a case where the information for generating the signal for controlling the external electronic apparatus according to the communication method used by the second communicator 120 may be acquired, the processor 130 may output a guide for controlling the external electronic apparatus according to the communication method used by the second communicator 120. At this time, the guide may notify that the external electronic apparatus may be controlled. Further, the guide may be provided as a visual or auditory UI, and a user command to select whether or not to control the external electronic apparatus by using the electronic apparatus 100 may be received through the UI.

In a case where (connection to the same network as that of the external electronic apparatus is not possible and) the information for generating the signal for controlling the external electronic apparatus according to the communication method used by the second communicator 120 may not be acquired, the processor 130 may output a guide for notifying that the external electronic apparatus may not be controlled by using the electronic apparatus 100. Further, the processor 130 may also output a guide to another method (e.g., a function of the external electronic apparatus and an operation method (directly performed by a user with respect to the external electronic apparatus) corresponding thereto) for controlling the external electronic apparatus.

Figure 5A:
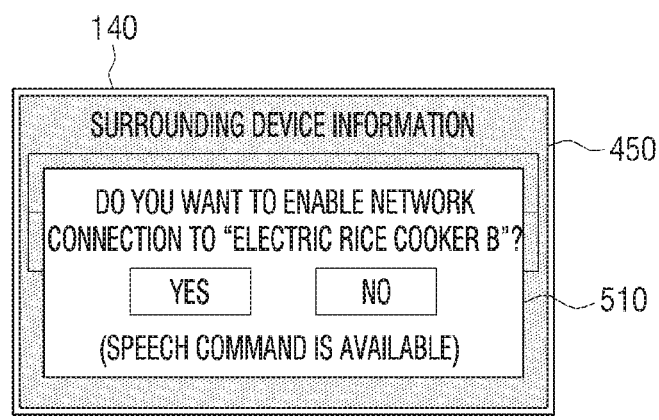
FIG. 5A is a diagram for describing an example in which a user interface (UI) of the electronic apparatus inquires whether or not to enable network connection with an external electronic apparatus.
Figure 5B:
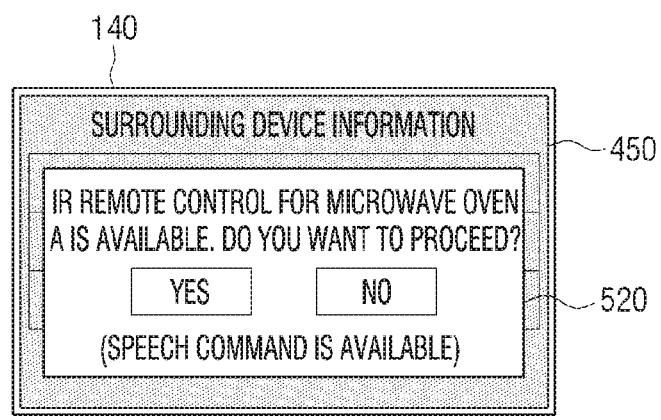
FIG. 5B is a diagram for describing an example in which an UI of the electronic apparatus inquires whether or not to perform a remote control with respect to an external electronic apparatus.

FIGS. 5A and 5B each are a diagram for describing an example in which a UI of the electronic apparatus 100 inquires whether or not to enable connection with an external electronic apparatus or whether or not to perform a control with respect to an external electronic apparatus.

FIG. 5A illustrates a situation in which a UI for selection of whether or not to enable network connection with the "electric rice cooker B" is displayed on the display 140. It is assumed that the "electric rice cooker B" and the first communicator 110 may be connected to the same network, in FIG. 5A.

In FIG. 5A, a UI 510 may be output automatically in the situation illustrated in FIG. 4B, or may be output as a result of touching, by the user, a portion displaying the "electric rice cooker B" of the UI 450 in the situation illustrated in FIG. 4B or 4C.

In the state illustrated in FIG. 5A, in a case where the user utters "Yes" or touches "YES" in the UI 510, the electronic apparatus 100 may be connected to the same network as that of the "electric rice cooker B" (electric rice cooker 200-1) through the first communicator 110. Further, the electronic apparatus 100 may control the "electric rice cooker B" (electric rice cooker 200-1) through the connected network.

Meanwhile, in the state illustrated in FIG. 5A, once the selection by the user is completed, the selection regarding whether or not to enable the network connection, the state in which only the UI 450 is displayed and the UI 510 is not displayed as in FIG. 4B may be restored.

FIG. 5B illustrates a situation in which a UI 520 for selection of whether or not to perform an IR remote control with the "microwave oven A" (microwave oven 200-2) is displayed on the display 140. In FIG. 5B, a situation, in which although the "microwave oven A" and the first communicator 110 may not be connected to the same network, the IR remote control may be performed with respect to the "microwave oven A" through the second communicator 120, is assumed.

In FIG. 5B, the UI 520 may be output automatically in the situation illustrated in FIG. 4C, or may be output as a result of touching, by the user, a portion displaying the "microwave oven A" of the UI 450, in the situation illustrated in FIG. 4C.

In the state illustrated in FIG. 5B, in a case where the user utters "Yes" or touches "YES" in the UI 520, the electronic apparatus 100 may be switched to a mode for remotely controlling the "microwave oven A" (microwave oven 200-2) through the second communicator 120.

Meanwhile, the respective UIs are not necessarily displayed visually as illustrated in FIGS. 5A and 5B, and may be output in a form of speech or in other forms. Further, the UI 520 provides information regarding a specific technical control method, that is, the "IR remote control" in FIG. 5B. However, the information regarding the specific technical control method may not be provided and wording such as "Do you want to start a control of microwave oven A?" or "Do you want to switch to a mode for controlling microwave oven A?" is also possible. It goes without saying that the disclosure is not limited to the wordings described above.

Regardless of using the first communicator or using the second communicator, the signal for controlling an external electronic apparatus may be based on input user speech. Specifically, the signal for controlling an external electronic apparatus may be based on contents of text obtained by converting the input user speech.

The input user speech may be directly input through a microphone (not illustrated) included in a user inputter (not illustrated) provided in the electronic apparatus 100, or may be input through a microphone of at least one external apparatus (not illustrated) and received through an input and output port (not illustrated), a broadcast receiver (not illustrated), or the first communicator 110 of the electronic apparatus 100 in a form of data/signal.

In a case where the external electronic apparatus may be connected to the same network as that of the first communicator 110, the processor 130 may connect the electronic apparatus 100 to the corresponding network through the first communicator 110 and control the first communicator 110 to transmit a signal for controlling the external electronic apparatus according to the input user speech to the external electronic apparatus through the corresponding network.

In a case where although the external electronic apparatus may not be connected to the same network as that of the first communicator 110, information for generating the signal for controlling the external electronic apparatus according to the communication method used by the second communicator 120 may be acquired, the processor 130 may control the second communicator 120 to generate the signal for controlling the external electronic apparatus according to the acquired information and the input user speech and transmit the generated signal to the external electronic apparatus.

Figure 6:
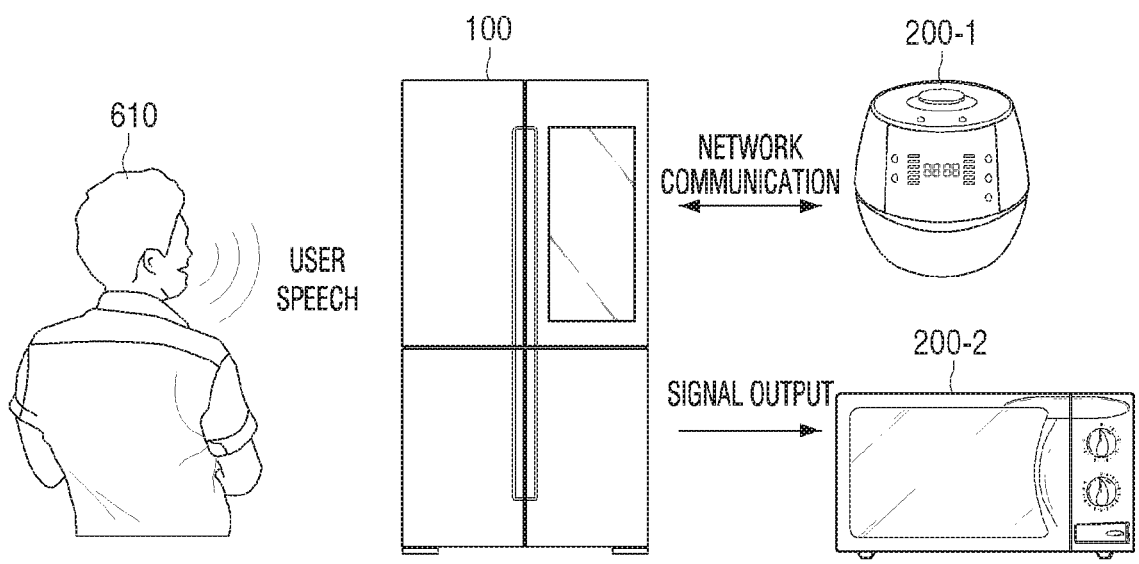
FIG. 6 is a diagram for describing an example in which the electronic apparatus recognizes speech of a user to control an external electronic apparatus.

FIG. 6 is a diagram for describing an example in which the electronic apparatus 100 recognizes input user speech to control an external electronic apparatus.

In FIG. 6, a situation, in which "YES" is selected in the UI 510 of FIG. 5A, and "YES" is selected in the UI 520 of FIG. 5B, is assumed.

Referring to FIG. 6, the electronic apparatus 100 that is a refrigerator may receive user speech from a user 610 and transmit, to the electric rice cooker 200-1, a signal for controlling the electric rice cooker 200-1 through network communication according to a result of recognizing the corresponding user speech.

For example, in a case where the user 610 utters "start cooking", the electronic apparatus 100 may transmit, to the electric rice cooker 200-1, a control signal according to a result of recognizing the utterance through the network communication, and accordingly, the electric rice cooker 200-1 may start cooking according to the speech of the user 610 even though the electric rice cooker 200-1 does not have a speech recognition function of its own.

Referring to FIG. 6, the electronic apparatus 100 that is a refrigerator may receive user speech from the user 610 and output a signal for controlling the microwave oven 200-2 according to a result of recognizing the corresponding user speech.

For example, in a case where the user 610 utters "stop cooking" in a state in which the microwave oven 200-2 is in a cooking operation, the electronic apparatus 100 that is a refrigerator may generate and output a signal according to a result of recognizing the utterance, and the microwave oven 200-2 receiving the output signal may stop cooking according to the speech of the user 610 input to the electronic apparatus 100 even through the microwave oven 200-2 does not have a speech recognition function of its own.

Before or in a process in which the electronic apparatus 100 receives or recognizes user speech for controlling an external electronic apparatus, the processor 130 may output a guide to utterance contents for controlling the external electronic apparatus. In this case, the guide may include one or more functions of the external electronic apparatus and utterance contents matched to the functions, respectively.

In this case, the processor 130 may additionally consider current state information of the external electronic apparatus. In this regard, the processor 130 may acquire state information of the external electronic apparatus based on text obtained by converting input speech output from the external electronic apparatus.

That is, the processor 130 may identify a state of the external electronic apparatus outputting the input speech through the input speech, in addition to identifying from which external electronic apparatus the input speech is output.

Figure 7A:
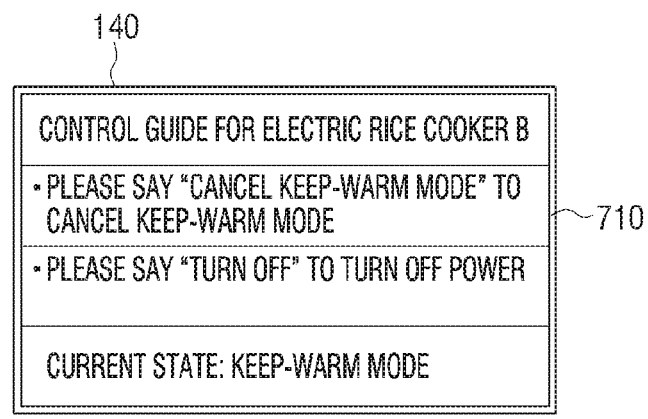
FIG. 7A is a diagram for describing an example in which the electronic apparatus provides a guide for controlling an external electronic apparatus.
Figure 7B:
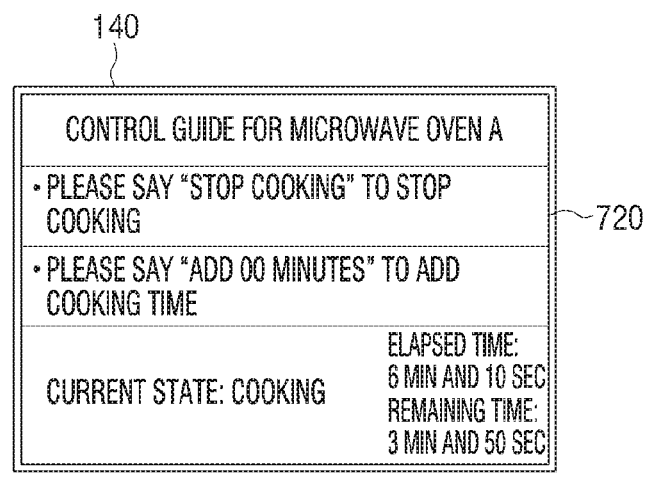
FIG. 7B is a diagram for describing an example in which the electronic apparatus provides a guide for controlling an external electronic apparatus.

FIGS. 7A and 7B each are a diagram for describing an example in which the electronic apparatus provides a guide to utterance contents for controlling an external electronic apparatus.

FIG. 7A illustrates an utterance content guide 710 for controlling the electric rice cooker 200-1 connected through the network, and FIG. 7B illustrates an utterance content guide 720 for controlling the microwave oven 200-2 which may be controlled remotely.

Referring to FIG. 7A, the utterance content guide 710 for controlling the "electric rice cooker B" (electric rice cooker 200-1) connected to the electronic apparatus 100 through the network is displayed on the display 140.

According to the utterance content guide 710, when the user utters "cancel keep-warm mode", the electronic apparatus 100 may control the electric rice cooker 200-1 to terminate a keep-warm operation.

Further, when the user utters "turn off", the electronic apparatus 100 may control the electric rice cooker 200-1 to be turned off.

Meanwhile, before the state illustrated in FIG. 7A, the electronic apparatus 100 may receive and recognize speech "cooking is complete" output from the electric rice cooker 200-1 to determine that the electric rice cooker 200-1 is in a state in which the cooking is complete and the electric rice cooker 200-1 is automatically switched to the "keep-warm" operation.

As a result, referring to FIG. 7A, the utterance content guide 710 may include information regarding a current state (keep-warm) of the electric rice cooker 200-1. Further, utterance contents such as "cancel keep-warm mode" and "turn off" included in the utterance content guide 710 may correspond to a command or a function suitable for the current state (keep-warm) of the electric rice cooker 200-1, such as "cancel of keep-warm mode" or "power off".

Referring to FIG. 7B, the utterance content guide 720 for controlling the "microwave oven A" (microwave oven 200-2) through the electronic apparatus 100 is displayed on the display 140.

According to the utterance content guide 720, when the user utters "stop cooking", the electronic apparatus 100 may control the microwave oven 200-2 to terminate a cooking operation that is currently performed by the microwave oven 200-2.

Further, when the user utters "add 00 minutes", the electronic apparatus 100 may control the microwave oven 200-2 to add 00 minutes to a cooking time for the cooking that is currently performed by the microwave oven 200-2.

Meanwhile, before the state illustrated in FIG. 7B, the electronic apparatus 100 may receive and recognize speech "start cooking for 10 minutes" output from the microwave oven 200-2 to determine that the microwave oven 200-2 is in the cooking operation. Specifically, the electronic apparatus 100 may also determine a current remaining cooking time based on a point in time at which the speech "start cooking for 10 minutes" is input.

As a result, referring to FIG. 7B, the utterance content guide 720 may include information (cooking, remaining time: 3 min and 50 sec) regarding a current state of the microwave oven 200-2. Further, utterance contents such as "stop cooking" and "add 5 minutes" included in the utterance content guide 720 may correspond to a command or a function suitable for the current state (cooking, remaining time: 3 min and 50 sec) of the microwave oven 200-2, such as "stop of cooking" or "adding 5 minutes to cooking time".

Meanwhile, although the examples of FIGS. 7A and 7B described above correspond to examples in which the respective guides 710 and 720 are visually output, the respective guides may also be output in an auditory form or in other forms.

In the examples described above, the process of receiving and recognizing user speech for controlling an external electronic apparatus may be performed autonomously by the electronic apparatus 100, and may also be at least partially performed by one or more external electronic apparatuses.

In this regard, as an example of reception of user speech, user speech for controlling an external electronic apparatus may not be directly input to the electronic apparatus 100 through a microphone (not illustrated) of the electronic apparatus 100, but a signal/data obtained by digitizing user speech input through a microphone (not illustrated) of a smartphone (not illustrated) may be received by the electronic apparatus 100 through a method such as Bluetooth or WiFi.

Further, as an example of user speech recognition, the processor 130 of the electronic apparatus 100 may convert user speech to text, or may transmit data/signal regarding the user speech to the server (not illustrated), such that the corresponding server may acquire text corresponding to the user speech.

In this case, information regarding the acquired text is transmitted from the corresponding server to the electronic apparatus 100 and as a result, the electronic apparatus 100 may control the external electronic apparatus to perform a function corresponding to the acquired text. Alternatively, the information regarding the acquired text is transmitted from the corresponding server to another separate server, a function of the external electronic apparatus corresponding to the acquired text is identified in the separate server, and when information regarding the identified function is finally received by the electronic apparatus 100, the electronic apparatus 100 may control the external electronic apparatus to perform the corresponding function.

Meanwhile, although only a case where the processor 130 controls the external electronic apparatus by using the second communicator in a case where the external electronic apparatus may not be connected to the same network as that of the first communicator 110 is described in the examples described above, it goes without saying that the processor 130 may control the external electronic apparatus by using the second communicator even in a case where the external electronic apparatus may be connected to the same network as that of the first communicator 110.

Meanwhile, only examples in which the electronic apparatus 100 directly provides the information regarding the identified external electronic apparatus and the UI related to the external electronic apparatus has been described with reference to FIGS. 4A, 4B, 4C, 5A, 5B, 7A, and 7B. However, the information regarding the identified external electronic apparatus and the UI related to the external electronic apparatus may also be provided through a separate external apparatus (not illustrated) which may perform communication with the electronic apparatus 100 in a wired or wireless manner.

Further, a user command may be received by the electronic apparatus 100 through the separate external apparatus, rather than being directly received by the electronic apparatus 100 as illustrated in FIG. 6, such that the electronic apparatus 100 may control one or more external electronic apparatuses according to a control by the external apparatus receiving the user command.

The separate external apparatus may correspond to various electronic devices such as a smartphone, a TV, a remote controller, and a PC.

Figure 8B:
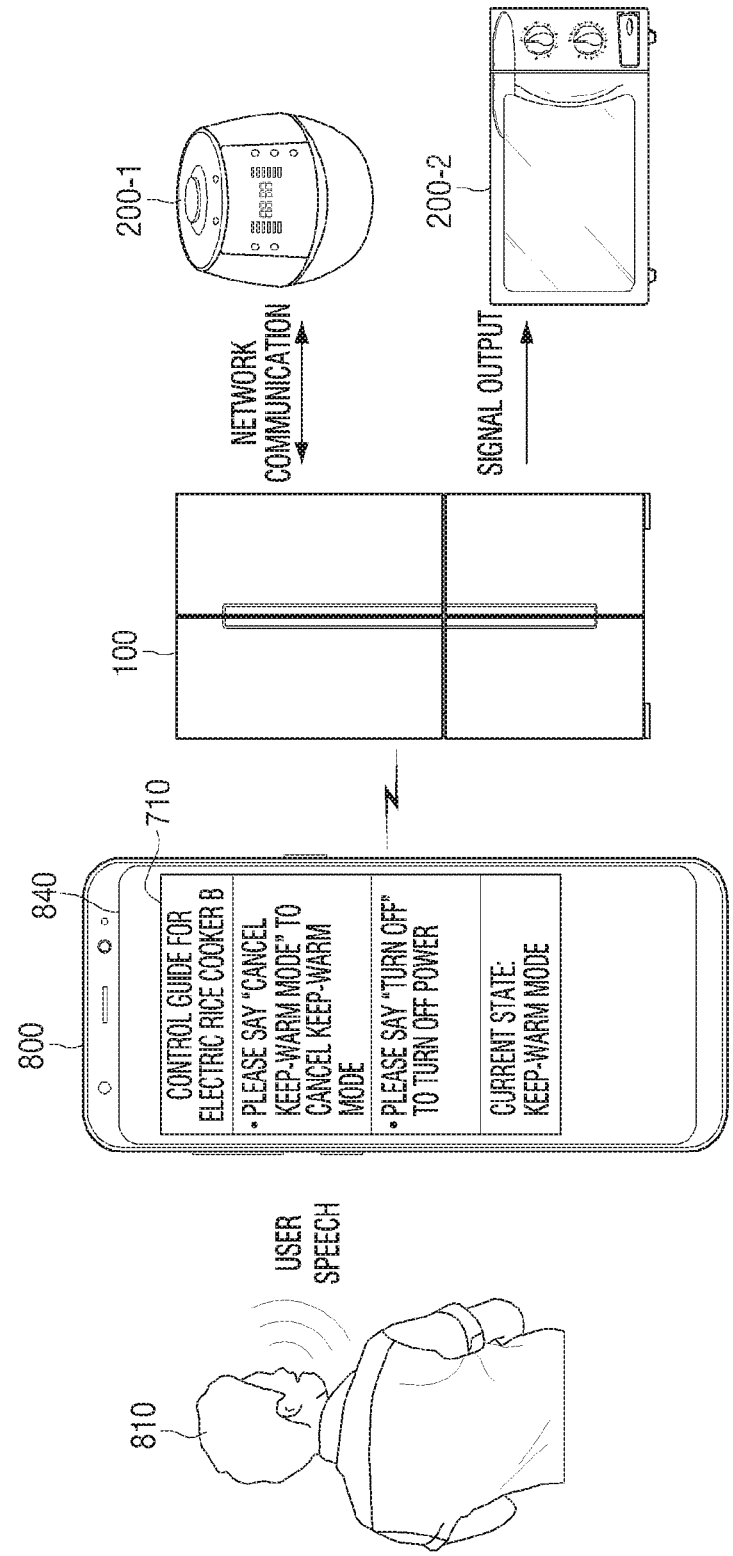
FIG. 8B is a diagram for describing an example in which an external apparatus receives a user command to make the electronic apparatus control an external electronic apparatus and transmits the user command to the electronic apparatus.

In this regard, FIGS. 8A and 8B each illustrate an example in which an external apparatus 800, which is implemented separately from the electronic apparatus 100, provides information regarding an external electronic apparatus identified through the electronic apparatus 100, and/or receives a user command.

Referring to FIG. 8A, the external apparatus 800 that is a smartphone may perform communication with the electronic apparatus 100 that is a refrigerator, to receive information regarding the external electronic apparatuses 200-1 and 200-2 identified by the electronic apparatus 100 and to display the UI 450 for providing information regarding a surrounding device by using the received information.

Further, although not illustrated in FIG. 8A, the external apparatus 800 may also provide a UI for selecting whether or not to enable network connection or whether or not to perform a remote control as illustrated in FIG. 5A or 5B.

FIG. 8B illustrates a situation in which the external apparatus 800 displays the utterance content guide 710 for controlling the electric rice cooker B (200-1) among the identified external electronic apparatuses 200-1 and 200-2.

Referring to FIG. 8B, the external apparatus 800 may receive a user command by recognizing speech (e.g., "cancel keep-warm mode" and "turn off") of a user 810 received through a microphone (not illustrated) of the external apparatus 800, and transmit information regarding the received user command to the electronic apparatus 100. At this time, the electronic apparatus 100 may control the electric rice cooker B (200-1) by using the received information.

Meanwhile, although not illustrated in FIG. 8B, an utterance content guide for controlling the microwave oven A (200-2) among the identified external electronic apparatuses 200-1 and 200-2 may also be provided through the external apparatus 800. In this case, the electronic apparatus 100 may receive, from the external apparatus 800, information regarding the user command recognized through the external apparatus 800 and control the microwave oven A (200-2) by using the received information.

Meanwhile, the examples of FIGS. 8A and 8B described above each correspond to an example in which the respective UI or guide is visually output, but the respective UI or guide may also be output in an auditory form or in other forms.

Figure 9:
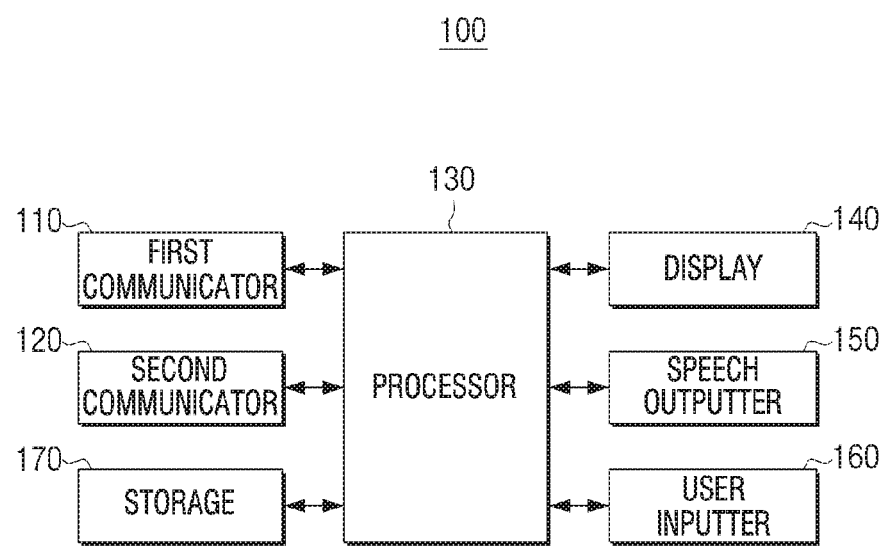
FIG. 9 is a block diagram for describing specific components of the electronic apparatus according to various embodiments of the disclosure.

FIG. 9 is a block diagram for describing specific components of the electronic apparatus 100 according to various embodiments of the disclosure.

Referring to FIG. 9, the electronic apparatus 100 may further include at least one of the display 140, a speech outputter 150, a user inputter 160, or a storage 170, in addition to the first communicator 110, the second communicator 120, and the processor 130.

The display 140 is a component for displaying one or more images according to a control by the processor 130. In this regard, the display 140 may be implemented by a liquid crystal display (LCD), a plasma display panel (PDP), an organic light emitting diode (OLED) display, a transparent OLED (TOLED) display, or the like. In a case where the display 140 is implemented by an LCD, the display 140 may include a driving circuit (not illustrated), a backlight unit (not illustrated), and the like, that may be implemented in a form such as an a-si thin film transistor (a-si TFT), a low temperature poly silicon TFT (LTPS TFT), an organic TFT (OTFT), and the like.

Meanwhile, the display 140 may also be implemented in a form of a touch screen including a touch panel capable of detecting a touch operation of a user, and in this case, it may be considered that the display 140 is included in the user inputter 160.

The processor 130 may control the display 140 to display, for example, identification information of an external electronic apparatus outputting input speech, information regarding network connection with an external electronic apparatus, a UI for network connection with an external electronic apparatus, a UI for a remote control with respect to an external electronic apparatus, and a guide to utterance contents corresponding to one or more functions of an external electronic apparatus.

The speech outputter 150 is a component for outputting speech according to a control by the processor 130. The speech outputter 150 may include a speaker (not illustrated) and/or a headphone/earphone output terminal (not illustrated).

The processor 130 may control the speech outputter 150 to output, for example, identification information of an external electronic apparatus outputting input speech, information regarding network connection with an external electronic apparatus, a UI for network connection with an external electronic apparatus, a UI for a remote control with respect to an external electronic apparatus, and a guide to utterance contents corresponding to one or more functions of an external electronic apparatus, in a form of speech.

The user inputter 160 is a component for receiving, by the electronic apparatus 100, a user input including a command or information from the user.

The user inputter 160 may include one or more buttons, a keyboard, a mouse, and the like (all of which are not illustrated).

The user inputter 160 may include a touch panel (not illustrated) implemented together with the display 140, or a separate touch panel (not illustrated). In this case, the electronic apparatus 100 may receive a user command for network connection with an external electronic apparatus or a remote control with respect to an external electronic apparatus, through a touch of the user on the user inputter 160. Further, the electronic apparatus 100 may receive a command for performing at least one function of an external electronic apparatus through a touch on the user inputter 160.

The electronic apparatus 100 may receive a user command in a form of a user motion. In this case, the user inputter 160 may include at least one camera (not illustrated) and acquire an image captured by the camera (not illustrated). Here, the at least one camera (not illustrated) may be a digital camera including an optical sensor. Further, the processor 130 may recognize the user motion from the image acquired from the user inputter 160.

The user inputter 160 may include a microphone (not illustrated) for receiving the user command in a speech form. In this case, the user inputter 160 may receive user speech corresponding to the user command for network connection with an external electronic apparatus or a remote control with respect to an external electronic apparatus. The speech input through the microphone may be digitized and transferred in a form of a digital signal/data to the processor 130.

Further, the electronic apparatus 100 may receive user speech corresponding to the user command for performing at least one function of an external electronic apparatus. In this case, the electronic apparatus 100 may control the external electronic apparatus according to contents of text obtained by recognizing the user speech input through the microphone (not illustrated).

The user inputter 160 may receive speech output from an external electronic apparatus through the microphone (not illustrated).

As a result of receiving the input speech through the user inputter 160, the processor 130 may identify a direction (based on the electronic apparatus 100) of the external electronic apparatus outputting the input speech. In this regard, the user inputter 160 may include a plurality of microphones (not illustrated) and the processor 130 may identify the direction of the external electronic apparatus by using a loudness level of speech input through each of the plurality of microphones. For example, a direction to which a microphone, that receives the input speech at the highest loudness level among the plurality of microphones, is directed may be identified as the direction of the external electronic apparatus.

In this case, the second communicator 120 may include a plurality of signal generators (not illustrated) to change a direction in which a control signal is output depending on the direction of the external electronic apparatus. Each of the plurality of signal generators may generate a signal for controlling an external electronic apparatus according to the communication method used by the second communicator 120, and may include an IR signal generator or an RF signal generator.

Specifically, once a user command for a function of an external electronic apparatus is received in a form of speech, the processor 130 may control the second communicator 120 to output an infrared signal corresponding to the user command only through a signal generator corresponding to a direction of the identified external electronic apparatus among the plurality of signal generators. Alternatively, the processor 130 may control the second communicator such that intensities of signals generated and output from a plurality of IR signal generators are different from each other depending on a direction of an identified electronic apparatus.

The storage 170 is a component for storing an operating system (OS) for controlling overall operation of the components of the electronic apparatus 100, and a command or data related to the components of the electronic apparatus 100.

In this regard, the storage 170 may include a non-volatile memory (e.g., a hard disk, a solid state drive (SSD), or a flash memory), a volatile memory, and the like.

The storage 170 may store information regarding speech output from a plurality of external electronic apparatuses. Further, the storage 170 may store a list of external electronic apparatuses that may be connected to the same network as that of the electronic apparatus.

The storage 170 may store, for example, information regarding one or more guides provided to the user in a case where network connection with an external electronic apparatus is possible, and information regarding one or more guides provided to the user in a case where network connection with an external electronic apparatus is not possible.

Further, the storage 170 may store various pieces of information required for operation of the electronic apparatus 100 according to the disclosure.

Meanwhile, although not illustrated in FIG. 9, the electronic apparatus 100 may include an input and output port (no illustrated) for transmitting and receiving data/signal to and from one or more external electronic apparatuses.

In this regard, the input and output port may be implemented by a wired port such as a high-definition multimedia interface (HDMI) port, a display port, an RGB port, a digital visual interface (DVI) port, a thunderbolt port, or a component port.

The input and output port may be implemented by a HDMI port, a thunderbolt port, or the like to transmit an image signal and a speech signal together, or may be implemented by a first port transmitting an image signal and a second port transmitting a speech signal, the first port and the second port being implemented separately.

The input and output port may include an interface module such as a universal serial bus (USB), and may be physically connected to an external terminal device such as a PC through such an interface module to transmit and receive speech or image data, or transmit and receive firmware data for firmware upgrade.

Figure 10A:
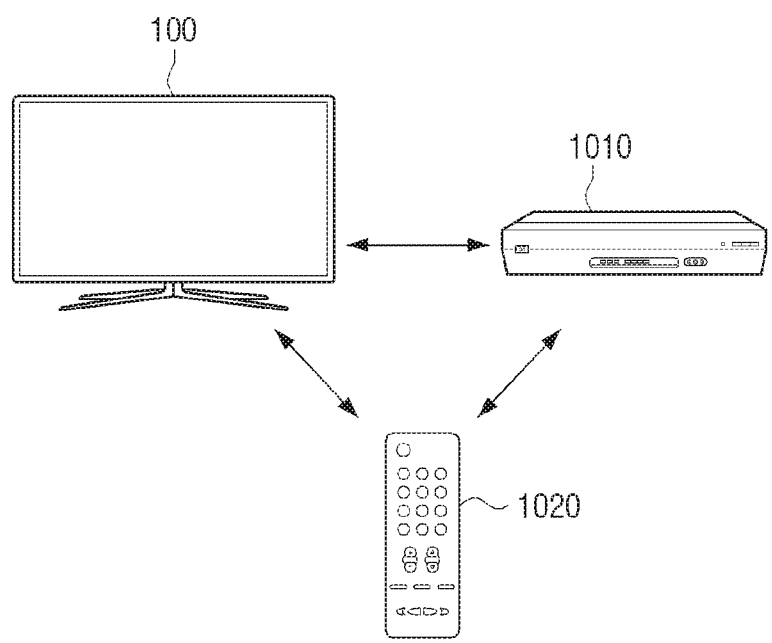
FIG. 10A is a diagram for describing an example of an electronic apparatus including an input and output port.
Figure 10B:
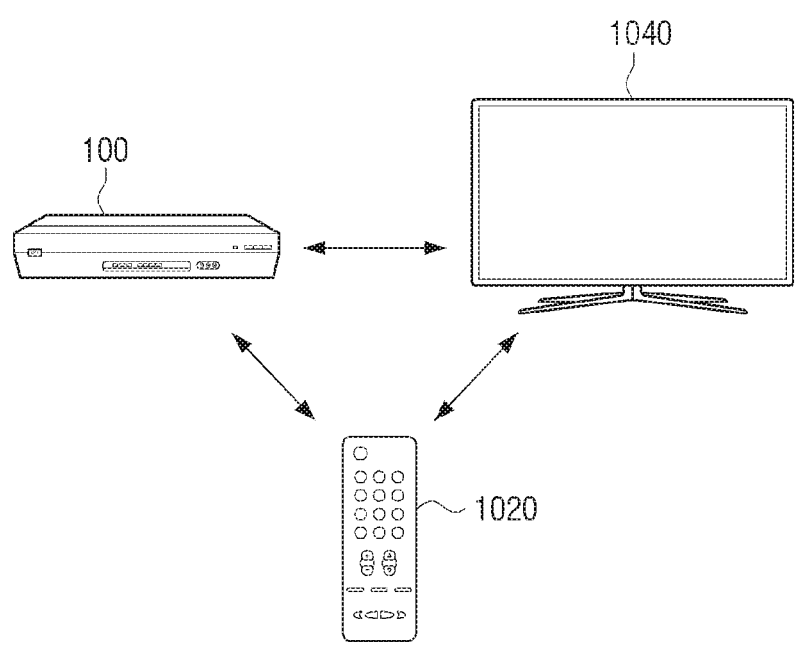
FIG. 10B is a diagram for describing an example of an electronic apparatus including an input and output port.

FIGS. 10A and 10B are diagrams for describing several examples of the electronic apparatus 100 including the input and output port.

Referring to FIG. 10A or 10B, the electronic apparatus 100 that is a TV or a set-top box may transmit and receive various data/signals to and from a set-top box 1010 or a TV 1040 through the input and output port. In this case, a remote controller 1020 may transmit a signal for remotely controlling the TV 100 or 1040, and/or the set-top box 1010 or 100.

FIG. 10A illustrates the electronic apparatus 100 that is a TV, and the set-top box 1010.

In this case, the electronic apparatus 100 that is a TV may store information regarding a guide provided in a case where the electronic apparatus 100 may be connected to the same network as that of an external electronic apparatus, and a guide provided in a case where the electronic apparatus 100 may not be connected to the same network as that of the external electronic apparatus, such that the corresponding guides may be output through the display 140 and/or the speech outputter 150 as needed.

Alternatively, the set-top box 1010 may store the information regarding the guide provided in a case where the electronic apparatus 100 may be connected to the same network as that of an external electronic apparatus, and the guide provided in a case where the electronic apparatus 100 may not be connected to the same network as that of the external electronic apparatus, and the electronic apparatus 100 that is a TV may receive the above-described information from the set-top box 1010 through the input and output port as needed, and output the corresponding guides through the display 140 and/or the speech outputter 150 as needed.

In FIG. 10A, user speech or speech of the external electronic apparatus may be received through a microphone (not illustrated) included in the electronic apparatus 100 that is a TV, or a signal/data obtained by digitizing speech input through the set-top box 1010 or the remote controller 1020 may be received by the electronic apparatus 100 through the input and output port or the first communicator 110.

FIG. 10B illustrates a situation in which the electronic apparatus 100 that is a set-top box is connected to the TV 1040.

In this case, the electronic apparatus 100 that is a set-top box may store information regarding a guide provided in a case where the electronic apparatus 100 may be connected to the same network as that of an external electronic apparatus, and a guide provided in a case where the electronic apparatus 100 may not be connected to the same network as that of the external electronic apparatus, and the electronic apparatus 100 may transmit the above-described information to the TV 1040 through the input and output port as needed, and as a result, the corresponding guides may be output through a display and/or a speech outputter included in the TV 1040 as needed.

In FIG. 10B, user speech or speech of the external electronic apparatus may be received through a microphone (not illustrated) included in the electronic apparatus 100 that is a set-top box, or a signal/data obtained by digitizing speech input through the TV 1040 or the remote controller 1020 may be received by the electronic apparatus 100 that is a set-top box through the input and output port or the first communicator 110.

In FIGS. 10A and 10B, the electronic apparatus 100 may receive a control signal using WiFi, Bluetooth, or IR communication from the remote controller 1020 through the first communicator 110.

In this case, the electronic apparatus 100 may perform (network) communication also with an external server (not illustrated) and the external electronic apparatus. However, in this case, the first communicator 110 may perform communication with the remote controller 1020, the external server, and the external electronic apparatus, as one component, or a third communicator (not illustrated) performing communication with the remote controller 1020 may be implemented separately from a fourth communicator (not illustrated) for performing (network) communication with the external server and the external electronic apparatus, in the first communicator 110.

As an example, the first communicator 110 may perform communication with all of the external server, the external electronic apparatus, and the remote controller 1020 through WiFi, and as another example, the third communicator performing communication with the external server and/or external electronic apparatus through WiFi, Bluetooth, or Ethernet may be implemented separately from the fourth communicator performing communication with the remote controller 1020 through Bluetooth, in the first communicator 110.

Meanwhile, in FIGS. 10A and 10B, it may be assumed not only that the remote controller 1020 is an actual remote controller device as illustrated, but also that an application for a remote control is installed in a terminal such as a smartphone. In this case, a remote control of the TV or the set-top box, speech recognition for the remote control, and the like may be performed through the smartphone.

Figure 11:
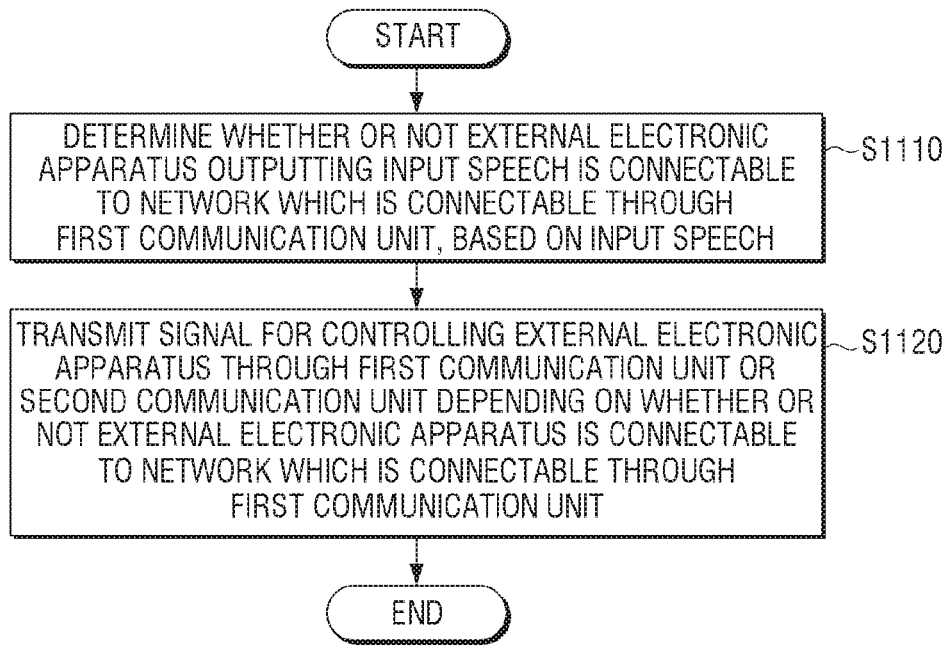
FIG. 11 is a flowchart for describing a control method for an electronic apparatus according to an embodiment of the disclosure.

FIG. 11 is a flowchart for describing a control method for an electronic apparatus according to an embodiment of the disclosure. Specifically, FIG. 11 is a flowchart for describing a control method for an electronic apparatus including the first communicator and the second communicator.

Referring to FIG. 11, in the control method, whether or not an external electronic apparatus outputting input speech may be connected to a network connectable through the first communicator may be determined based on the input speech (S1110).

At this time, identification information of the external electronic apparatus may be acquired based on information regarding the input speech. The information regarding the input speech may be feature information of the input speech, and/or information regarding text obtained by recognizing and converting the input speech.

As a specific example, the identification information of the external electronic apparatus may be acquired based on text obtained by converting the input speech, and whether or not the external electronic apparatus corresponds to an electronic apparatus that is connectable to the network based on the acquired identification information of the external electronic apparatus may be determined.

At this time, information regarding at least one of a product name or a manufacturer of the external electronic apparatus may be acquired by searching a server, in which information regarding speech output from each of a plurality of external electronic apparatuses is stored, for an external electronic apparatus outputting the speech, which corresponds to the text obtained by converting the input speech.

Further, a signal for controlling the external electronic apparatus may be transmitted through the first communicator or the second communicator depending on whether or not the external electronic apparatus may be connected to the network connectable through the first communicator.

Specifically, in a case where the external electronic apparatus may be connected to the same network as that of the first communicator, the signal for controlling the external electronic apparatus may be transmitted to the external electronic apparatus through the corresponding network and the first communicator, and in a case where the external electronic apparatus may not be connected to the same network as that of the first communicator, the signal for controlling the external electronic apparatus may be transmitted to the external electronic apparatus through the second communicator.

At this time, in a case where the external electronic apparatus may be connected to the same network as that of the first communicator, the electronic apparatus may be connected to the corresponding network through the first communicator. As an example, the first communicator may be controlled to enable connection to the corresponding network through at least one communication method of WiFi or Bluetooth.

Further, the signal for controlling the external electronic apparatus according to the input user speech may be transmitted to the external electronic apparatus through the corresponding network and the first communicator. Specifically, text may be acquired by recognizing the input user speech and a control signal to make the external electronic apparatus perform a function corresponding to the acquired text may be transmitted to the external electronic apparatus.

In a case where the external electronic apparatus may be connected to the same network as that of the first communicator, a guide for connecting the external electronic apparatus to the corresponding network may be output.

In contrast, in a case where the external electronic apparatus may not be connected to the same network as that of the first communicator, a guide for notifying that the external electronic apparatus may not be connected to the corresponding network may be output.

In a case where the external electronic apparatus may not be connected to the same network as that of the first communicator, the external electronic apparatus may not be controlled through the first communicator, but may be controlled according to the communication method used by the second communicator. However, first, there is a need to identify or determine whether or not the external electronic apparatus may be controlled according to the communication method used by the second communicator.

To this end, whether or not information for generating a signal for controlling the external electronic apparatus according to the communication method used by the second communicator may be acquired may be determined. The information for generating a signal for controlling the external electronic apparatus may be pre-stored in the electronic apparatus and/or may be stored in an external server.

In a case where the information for generating the signal for controlling the external electronic apparatus according to the communication method used by the second communicator may be acquired, the signal for controlling the external electronic apparatus may be generated according to the acquired information and the input user speech, and the generated signal may be transmitted to the external electronic apparatus through the second communicator. Specifically, an infrared signal for controlling the external electronic apparatus may be transmitted to the external electronic apparatus through the second communicator.

In a case where the external electronic apparatus may not be connected to the same network as that of first communicator, and the information for generating the signal for controlling the external electronic apparatus according to the communication method used by the second communicator may not be acquired, a guide for notifying that the external electronic apparatus may not be controlled by using the electronic apparatus may be output.

Meanwhile, in the control method, state information of the external electronic apparatus may be acquired based on text obtained by converting the input speech, and a guide to utterance contents for controlling the external electronic apparatus based on the acquired state information of the external electronic apparatus may be output. That is, a guide to utterance contents corresponding to a function of the external electronic apparatus that matches a current state of the external electronic apparatus is provided to induce the user to utter user speech corresponding to a command that matches the state of the external electronic apparatus.

This is under the premise that the external electronic apparatus may be controlled through the electronic apparatus. Specifically, this is under the premise that the external electronic apparatus may be connected to the same network as that of the first communicator, and/or the electronic apparatus may be controlled according to the communication method used by the second communicator.

Figure 12:
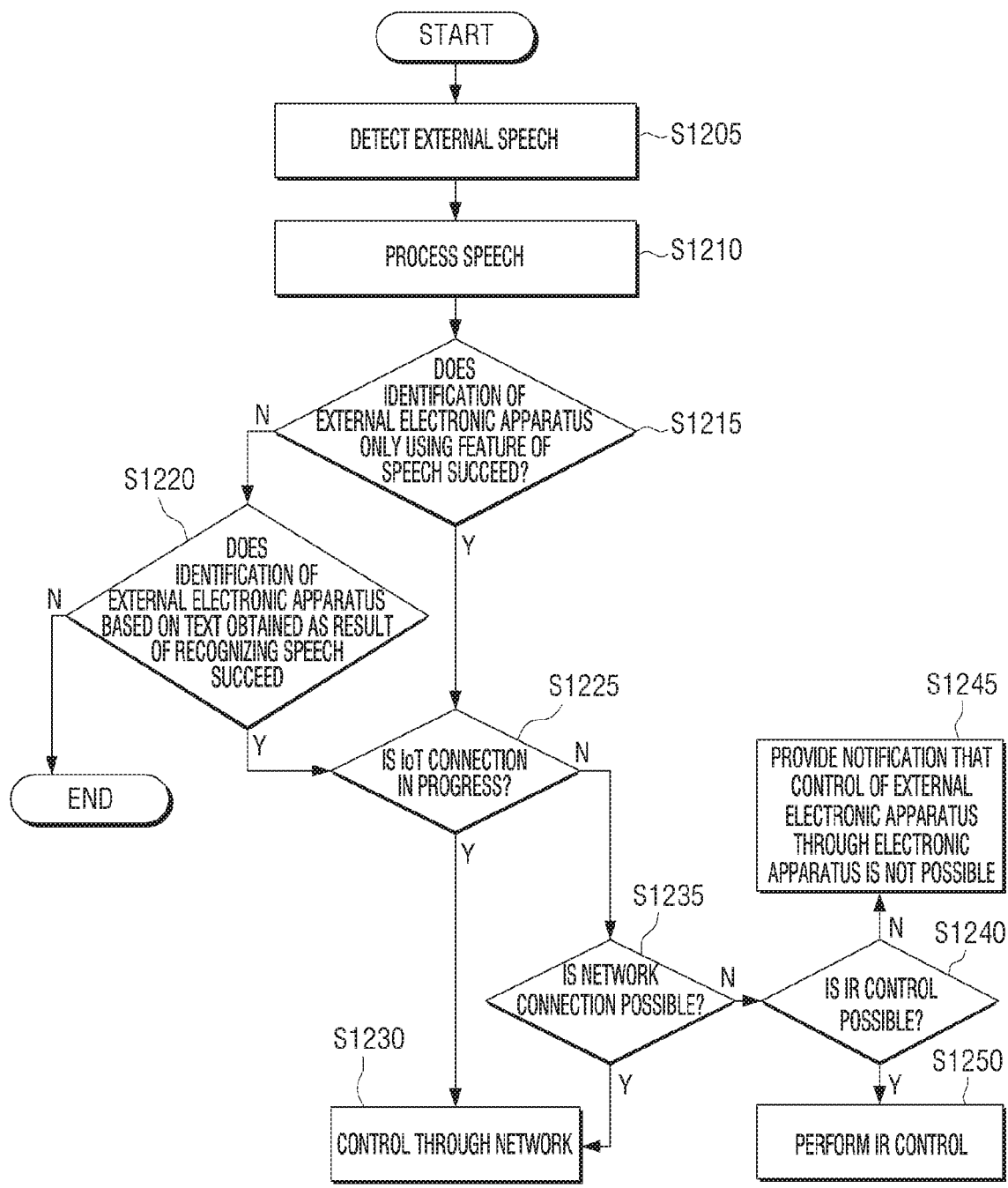
FIG. 12 is an algorithm chart for describing an example of a process of identifying an external electronic apparatus and setting a method for controlling the identified external electronic apparatus.

FIG. 12 is an algorithm chart for describing an example of a process of identifying an external electronic apparatus and setting a method for controlling the identified external electronic apparatus.

Referring to FIG. 12, after input external speech is detected (S1205), the corresponding speech may be processed to extract feature information from the processed speech (S1210). The feature information may correspond to various parameters obtained by performing digitization, frequency conversion, and the like with respect to the input speech, such as pitch, formant, a linear predictive cepstral coefficient (LPCC), a mel-frequency cepstral coefficient (MFCC), a perceptual linear predictive (PLP) coefficient, and the like.

Then, an external electronic apparatus outputting the corresponding speech is identified by using the extracted feature information (S1215). Specifically, among information regarding speech of each of a plurality of external electronic apparatuses stored in the electronic apparatus or an external server, information corresponding to the extracted feature information may be retrieved to identify a product name, a manufacturer, and/or the like of the external electronic apparatus outputting the input speech.

In a case where it is not possible to identify the external electronic apparatus outputting the corresponding speech by using the extracted feature information (S1215—N), the external electronic apparatus outputting the input speech may be identified based on text obtained as a result of recognizing the input speech (S1220). Specifically, among the information regarding the speech of each of the plurality of external electronic apparatuses stored in the electronic apparatus or the external server, information corresponding to the text obtained as a result of recognizing the input speech may be retrieved to identify the external electronic apparatus outputting speech corresponding to the text.

In a case where it is possible to identify the external electronic apparatus outputting the input speech even based on the text obtained as a result of recognizing the input speech (S1220—N), it is not possible to identify the external electronic apparatus unless communication connection to the external electronic apparatus is already made, and thus the external electronic apparatus may not be controlled through the electronic apparatus.

In contrast, in a case where identification of the external electronic apparatus outputting the input speech succeeds (S1215—Y, S1220—Y), whether or not the current external electronic apparatus is connected (e.g., IoT) through the same network as that of the electronic apparatus (S1225). In a case where the external electronic apparatus is already connected through the same network (S1225—Y), the external electronic apparatus may be controlled through the corresponding network (S1230).

In contrast, in a case where the external electronic apparatus is not connected through the same network (S1225—N), whether or not the external electronic apparatus may be connected to the same network as that of the first communicator of the electronic apparatus may be determined (S1235).

In a case where the external electronic apparatus may be connected through the same network (S1235—Y), the electronic apparatus may be connected to the external electronic apparatus through the corresponding network to control the external electronic apparatus (S1230).

In contrast, in a case where the external electronic apparatus may not be connected through the same network (S1235—N), whether or not the external electronic apparatus may be remotely controlled based on an IR signal may be determined (S1240).

In a case where it is possible to control the external electronic apparatus even based on the IR signal (S1240—N), a notification that a control of the external electronic apparatus through the electronic apparatus is not possible may be provided (S1245).

In contrast, in a case where it is possible to control the external electronic apparatus even based on the IR signal (S1240—Y), the electronic apparatus may enter a mode for controlling the external electronic apparatus by using the IR signal (S1250).

The above-described control method for an electronic apparatus illustrated in FIGS. 11 and 12 may be implemented through the electronic apparatus 100 illustrated and described with reference to FIGS. 2 and 9. Alternatively, the above-described control method for an electronic apparatus may be implemented through a system including the electronic apparatus 100 and one or more external apparatuses.

As an example, the electronic apparatus 100 only receives speech of an external electronic apparatus through the microphone (not illustrated), and information regarding the received speech may be transmitted to the server (not illustrated). In this case, an operation of identifying the external electronic apparatus by using the received information regarding the speech and determining whether or not the identified external electronic apparatus may be connected to the same network as that of the electronic apparatus 100 and the server may be performed by the server. Further, information regarding a guide provided according to a result of determining whether or not the external electronic apparatus may be connected to the same network as that of the electronic apparatus 100 and the server may be transmitted from the server to the electronic apparatus 100, and then provided in the electronic apparatus 100 visually or in an auditory form.

Then, once user speech is input through the microphone of the electronic apparatus 100, information regarding the input user speech is transmitted to the server, then the server may recognize the corresponding speech and transmit information regarding a function of the external electronic apparatus corresponding to a recognition result to the electronic apparatus 100 or the external electronic apparatus.

As another example, in a case where the electronic apparatus 100 directly identifies an external electronic apparatus outputting input speech and then transmits identification information of the identified external electronic apparatus to the server (not illustrated), the server may determine whether or not the corresponding external electronic apparatus may be connected to the same network as that of the electronic apparatus 100 and the server. Further, once information regarding a result of the determination is transmitted to the electronic apparatus 100, the electronic apparatus 100 may provide a relevant guide.

In this case, the electronic apparatus 100 may recognize the input user speech and search the electronic apparatus and/or the server for a function of the external electronic apparatus corresponding to the recognized user speech. Then, the electronic apparatus 100 may transmit a control signal to the external electronic apparatus to make the external electronic apparatus perform the corresponding function. Specifically, the electronic apparatus 100 may transmit the control signal to the external electronic apparatus through the server in a case where connection through the same network is possible, or may transmit the control signal directly to the external electronic apparatus in a case where the connection through the same network is not possible.

Meanwhile, the various embodiments of the disclosure described above may be implemented in a recording medium readable by a computer or a device similar to the computer, using software, hardware, or a combination of software and hardware.

According to a hardware implementation, the embodiments described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

In some cases, the embodiments described in the disclosure may be implemented by the processor 130 itself. According to a software implementation, the embodiments such as procedures and functions described in the disclosure may be implemented by separate software modules. Each of the software modules may perform one or more functions and operations described in the disclosure.

Meanwhile, computer instructions for performing processing operations of the electronic apparatus 100 according to the various embodiments of the disclosure described above may be stored in a non-transitory computer-readable medium. The computer instructions stored in the non-transitory computer-readable medium allow a specific device to perform the processing operations of the electronic apparatus 100 according to the various embodiments described above when they are executed by a processor of the specific device.

The non-transitory computer-readable medium is not a medium that stores data therein for a while, such as a register, a cache, a memory, or the like, but means a medium that semi-permanently stores data therein and is readable by an apparatus. In detail, the various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the embodiments of the disclosure have been illustrated and described hereinabove, the disclosure is not limited to the specific embodiments described above, but may be variously modified by those skilled in the art to which the disclosure pertains without departing from the scope and spirit of the disclosure as claimed in the claims. These modifications should also be understood to fall within the technical spirit and scope of the disclosure.

What is claimed is:

1. An electronic apparatus comprising:
   a memory; and
   a first communicator;
   a second communicator;
   a processor, coupled to the memory, and configured to:
   receive speech provided from an external electronic device;
   obtain identification information of the external electronic apparatus based on text obtained by converting the received speech;
   identify whether or not the external electronic apparatus is connectable to and/or connected to a first network with the electronic apparatus based on the obtained identification information of the external electronic apparatus;
   based on the external electronic apparatus being identified to be connectable to and/or connected to the first network with the electronic apparatus, control the first communicator to enable a connection to the first network through wireless fidelity (WiFi) and/or Bluetooth;
   transmit a first signal for controlling the external electronic apparatus to the external electronic apparatus through the WiFi and/or the Bluetooth; and
   based on the external electronic apparatus being identified to not be connectable to and/or connected to the first network with the electronic apparatus, control the second communicator to transmit an infrared signal for controlling the external electronic apparatus to the external electronic apparatus,
   wherein the processor is further configured to obtain state information of the external electronic apparatus based on the text obtained by converting the received speech, and output a guide to guide a user of utterance contents for controlling the external electronic apparatus based on the obtained state information of the external electronic apparatus.

2. The electronic apparatus as claimed in claim 1, wherein the identification information includes information regarding at least one of a product name and a manufacturer of the external electronic apparatus, and
   the processor is configured to obtain the identification information by searching, based on the text obtained by converting the speech, a server storing information regarding speech of each of a plurality of external electronic apparatuses.

3. The electronic apparatus as claimed in claim 1, wherein the processor is configured to:
   transmit the first signal for controlling the external electronic apparatus to the external electronic apparatus through the WiFi and/or the Bluetooth, according to speech of a user.

4. The electronic apparatus as claimed in claim 1, wherein the processor is configured to:
   output a guide for guiding a user to connect the external electronic apparatus to the first network, based on the external electronic apparatus being identified to be connectable to the first network with the electronic apparatus, and
   output a guide for notifying the user that the external electronic apparatus is not connectable to the first network with the electronic apparatus, based on the external electronic apparatus being identified to be not connectable to the first network with the electronic apparatus.

5. The electronic apparatus as claimed in claim 1, further comprising:
   a first communicator connectable to the first network to transmit the first signal for controlling the external electronic apparatus to the external electronic apparatus through the first network; and
   a second communicator to transmit the second signal for controlling the external electronic apparatus to the external electronic apparatus through the second network,
   wherein the processor is configured to:
   identify whether or not information for generating the second signal for controlling the external electronic apparatus according to a communication method used by the second communicator is obtainable, based on the external electronic apparatus being identified to not be connectable to and/or connected to the first network with the electronic apparatus.

6. The electronic apparatus as claimed in claim 5, wherein the processor is configured to output a guide for notifying a user that the external electronic apparatus is not controllable through the electronic apparatus, based on the information for generating the second signal for controlling the external electronic apparatus being identified to not be obtainable.

7. The electronic apparatus as claimed in claim 1, further comprising:
   a first communicator connectable to the first network to transmit the first signal for controlling the external electronic apparatus to the external electronic apparatus through the first network; and
   a second communicator to transmit the second signal for controlling the external electronic apparatus to the external electronic apparatus through the second network,
   wherein the processor is configured to:
   control the first communicator to transmit the first signal for controlling the external electronic apparatus to the external electronic apparatus through the first network, based on the external electronic apparatus being identified to be connectable to and/or connected to the network first network with the electronic apparatus, and
   control the second communicator to transmit the second signal for controlling the external electronic apparatus to the external electronic apparatus through the second network, based on the external electronic apparatus being identified to not be connectable to and/or connected to the first network with the electronic apparatus control the second communicator to transmit the generated signal to the external electronic apparatus, in a case where the information is acquirable.

8. A method comprising:
by an electronic apparatus,
receiving speech provided from an external electronic device;
obtaining identification information of the external electronic apparatus based on text obtained by converting the speech;
identify whether or not the external electronic apparatus is connectable to and/or connected to a first network with the electronic apparatus based on the obtained identification information of the external electronic apparatus;
based on the external electronic apparatus being identified to be connectable to and/or connected to the first network with the electronic apparatus, controlling a first communicator of the electronic apparatus to enable connection to the first network through wireless fidelity (WiFi) and/or Bluetooth and transmitting a first signal for controlling the external electronic apparatus to the external electronic apparatus through the WIFI or and/or the Bluetooth; and
based on the external electronic apparatus being identified to not be connectable to and/or connected to the first network with the electronic apparatus, controlling a second communicator of the electronic apparatus to transmit an infrared signal for controlling the external electronic apparatus to the external electronic apparatus and transmitting a second signal for controlling the external electronic apparatus to the external electronic apparatus through second network different from the first network,
wherein the method further comprising:
obtaining state information of the external electronic apparatus based on text obtained by converting the speech; and
outputting a guide to guide a user of utterance contents for controlling the external electronic apparatus, based on the obtained state information of the external electronic apparatus.

9. The method as claimed in claim 8, wherein:
the identification information includes information regarding at least one of a product name and a manufacturer of the external electronic apparatus, and
the method further comprising, by the electronic apparatus, searching, based on the text obtained by converting the speech, a server storing information regarding speech of each of a plurality of external electronic apparatuses.

10. The method as claimed in claim 8, wherein the transmitting the first signal for controlling the external electronic apparatus to the external electronic apparatus through the WIFI or and/or Bluetooth comprises:
transmitting the first signal for controlling the external electronic apparatus to the external electronic apparatus through the WIFI or and/or Bluetooth, according to speech of a user.

11. The method as claimed in claim 8, further comprising:
by the electronic apparatus,
outputting a guide for guiding a user to connect the external electronic apparatus to the first network, based on the external electronic apparatus being identified to be connectable to the first network with the electronic apparatus; and
outputting a guide for notifying the user that the external electronic apparatus is not connectable to the first network, based on the external electronic apparatus being identified to not be connectable to the first network with the electronic apparatus.

12. The method as claimed in claim 8, wherein the electronic apparatus includes a first communicator connectable to the first network to transmit the first signal for controlling the external electronic apparatus to the external electronic apparatus through the first network, and a second communicator to transmit the second signal for controlling the external electronic apparatus to the external electronic apparatus through the second network, and the method further comprising:
by the electronic apparatus,
identifying whether or not information for generating the second signal for controlling the external electronic apparatus according to a communication method used by the second communicator is obtainable, based on the external electronic apparatus being identified to not be connectable to and/or connected to the first network with the electronic apparatus.

13. The method as claimed in claim 12, further comprising:
by the electronic apparatus,
outputting a guide for notifying a user that the external electronic apparatus is not controllable through the electronic apparatus, based on the information for generating the second signal for controlling the external electronic apparatus being identified to not be obtainable.

14. The method as claimed in claim 8, wherein the electronic apparatus includes a first communicator connectable to the first network to transmit the first signal for controlling the external electronic apparatus to the external electronic apparatus through the first network, and a second communicator to transmit the second signal for controlling the external electronic apparatus to the external electronic apparatus through the second network, and the method further comprising:
by the electronic apparatus,
controlling the first communicator to transmit the first signal for controlling the external electronic apparatus to the external electronic apparatus through the first network, based on the external electronic apparatus being identified to be connectable to and/or connected to the first network with the electronic apparatus; and
controlling the second communicator to transmit the second signal for controlling the external electronic apparatus to the external electronic apparatus through the second network, based on the external electronic apparatus being identified to not be connectable to and/or connected to the first network with the electronic apparatus.

* * * * *